United States Patent
Salazar et al.

(10) Patent No.: US 7,432,934 B2
(45) Date of Patent: Oct. 7, 2008

(54) SYSTEM AND METHOD FOR DISPLAY SHARING

(75) Inventors: Gabriel Salazar, Denver, CO (US); Roland Hochmuth, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 475 days.

(21) Appl. No.: 11/253,978

(22) Filed: Oct. 19, 2005

(65) Prior Publication Data

US 2007/0094413 A1 Apr. 26, 2007

(51) Int. Cl.
- *H04M 3/56* (2006.01)
- *G06F 15/16* (2006.01)
- *G06F 9/46* (2006.01)
- *G06F 9/445* (2006.01)
- *H04L 12/18* (2006.01)

(52) U.S. Cl. .............. 345/522; 345/418; 345/501; 709/201; 709/205; 709/248; 715/203; 715/753

(58) Field of Classification Search ............ 345/522, 345/520, 418–419, 581, 619, 501; 709/201–205, 709/217–219, 238, 248, 250; 713/200–203, 713/753, 759, 375; 715/200, 203, 753, 759
See application file for complete search history.

(56) References Cited

U.S. PATENT DOCUMENTS

| | | | | |
|---|---|---|---|---|
| 5,760,769 A | * | 6/1998 | Petrie | 715/759 |
| 5,867,156 A | * | 2/1999 | Beard et al. | 715/753 |
| 5,870,765 A | * | 2/1999 | Bauer et al. | 707/203 |
| 5,874,960 A | | 2/1999 | Mairs et al. | |
| 5,884,325 A | * | 3/1999 | Bauer et al. | 707/201 |
| 6,115,027 A | * | 9/2000 | Hao et al. | 715/858 |
| 6,147,773 A | * | 11/2000 | Taylor et al. | 358/400 |
| 6,173,315 B1 | * | 1/2001 | Deleeuw | 709/205 |
| 6,741,586 B1 | | 5/2004 | Schuster et al. | |
| 2006/0117107 A1 | * | 6/2006 | Shafron et al. | 709/227 |
| 2007/0165035 A1 | * | 7/2007 | Duluk et al. | 345/506 |

OTHER PUBLICATIONS

"Open GL—a Whatis.com definition", [Online] Retrieved on Mar. 8, 2005 Retrieved from http://searchvb.techtarget.com/sDefinition/0,,sid8_gci212707,00.html 3 pages.

* cited by examiner

Primary Examiner—Wesner Sajous (57) ABSTRACT

According to one embodiment, a method comprises detecting a graphics call directed from an application executing on a host computer to an operating system's graphics interface, wherein the operating system's graphics interface does not trigger synchronization of a guest computer's display. The method further comprises, responsive to such detecting, triggering synchronization of a display of at least one guest computer that is communicatively coupled to the host computer to reflect the graphics call. According to one embodiment, a method comprises determining a three-dimensional (3D) graphics operation is communicated along a 3D graphics communication path of a host computer, and using a communication path for two-dimensional (2D) graphics operations on the host computer to trigger notification to a guest computer of a display change resulting from the 3D graphics operation.

31 Claims, 5 Drawing Sheets

SYSTEM AND METHOD FOR DISPLAY SHARING

BACKGROUND OF THE INVENTION

Computer display sharing techniques are becoming popular. In general, display sharing enables the display of one computer to also be displayed (shared) on one or more other computers. Computers may be communicatively coupled via a communication network, and certain computers may "share" another computer to which they are communicatively coupled. Display sharing aids collaboration among various users, for example, because the users can see a common display on their respective computers. Various software applications are available for performing display sharing, e.g., the Netmeeting product available from Microsoft, and the ASAP Express and ASAP Pro products available from Convoq.

Remote desktop sharing enables users to call a remote computer to access its shared desktop and applications. In this sense, remote need not be physically distant, but may be a separate computer that is communicatively coupled to the given computer. Thus, for example, a user may operate their office computer from home or vice-versa. Similarly, multiple users in a single conference room may each have computers (e.g., laptops) and may share a display to aid in their collaboration during a meeting. Accordingly, such "remote" computer may be referred to herein as a "guest" computer, which shares the display of a "host" computer. The "host" computer refers to the computer on which an application is executing for generating the information to be displayed on the host and guest computers. In some instances, a computer may act as a "guest" for all or part of one display-sharing session, and it may act as a "host" for all or part of another display-sharing session.

In certain display sharing applications, a host computer may run applications, receive user input, etc., and one or more guest computers may display the display of the host computer. In certain display sharing applications, the guest computer(s) may communicate information to the host computer to interact with an application executing on the host computer, etc., just as a local user may interact directly with the host computer.

In display sharing, it is desirable to maintain the displays of the host and guest computers synchronized. That is, when a display of the host computer changes, the guest computer's display should change accordingly to keep the displays synchronized. Of course, some amount of delay generally exists in this synchronization, as the updated information is communicated over a communication network.

A known technique for enabling such synchronization is provided by the Microsoft Windows Graphics Device Interface (GDI), which copies drawing operations to a mirror driver as well as to the actual graphics hardware of the host computer (for rendering the graphics on the host computer's display). Thus, the mirror driver sees all of the same drawing operations that a real graphics device sees via GDI. The mirror driver uses the information from these operations to construct a list of regions that have changed on the display. Accordingly, the mirror driver can use this information to synchronize the display(s) of any guest(s) that may be sharing the host computer's display.

However, GDI only handles two-dimensional (2D) graphics operations. Three-dimensional (3D) drawing applications, such as OpenGL, communicate graphics operations (e.g., drawing commands) via a different communication path than 2D graphics operations. For efficiency concerns, 3D drawing applications generally communicate directly to the graphics hardware, and do not communicate their operations through GDI, and thus the operations are not copied to the mirror driver. Therefore, difficulty arises in maintaining synchronized displays between a host and guest when a 3D drawing application is being used.

Other instances may arise in the prior art wherein a graphics call (e.g., of a 2D or 3D graphics application) to the graphics interface of the operating system (OS) of a host computer does not trigger synchronization of a guest computer's display. For instance, the host computer's OS may have a graphics interface that does not trigger synchronization of a guest computer's display for 2D and/or 3D graphics calls. Therefore, difficulty arises in maintaining synchronized displays between a host and a guest.

DETAILED DESCRIPTION

Embodiments of the present invention provide systems and methods for supporting display sharing when an operating system's graphics interface does not support display sharing. Systems and methods are provided for supporting display sharing when the operating system's graphics interface on a host computer does not trigger synchronization of a guest computer's display responsive to a graphics operation (two-dimensional (2D) and/or three-dimensional (3D) operation) being performed via such graphics interface on the host computer. Certain embodiments of the present invention provide systems and methods for performing display sharing when using 3D graphics operations, e.g., displays of a host computer and one or more guest computers are synchronized for 3D graphics operations.

Figure 1:
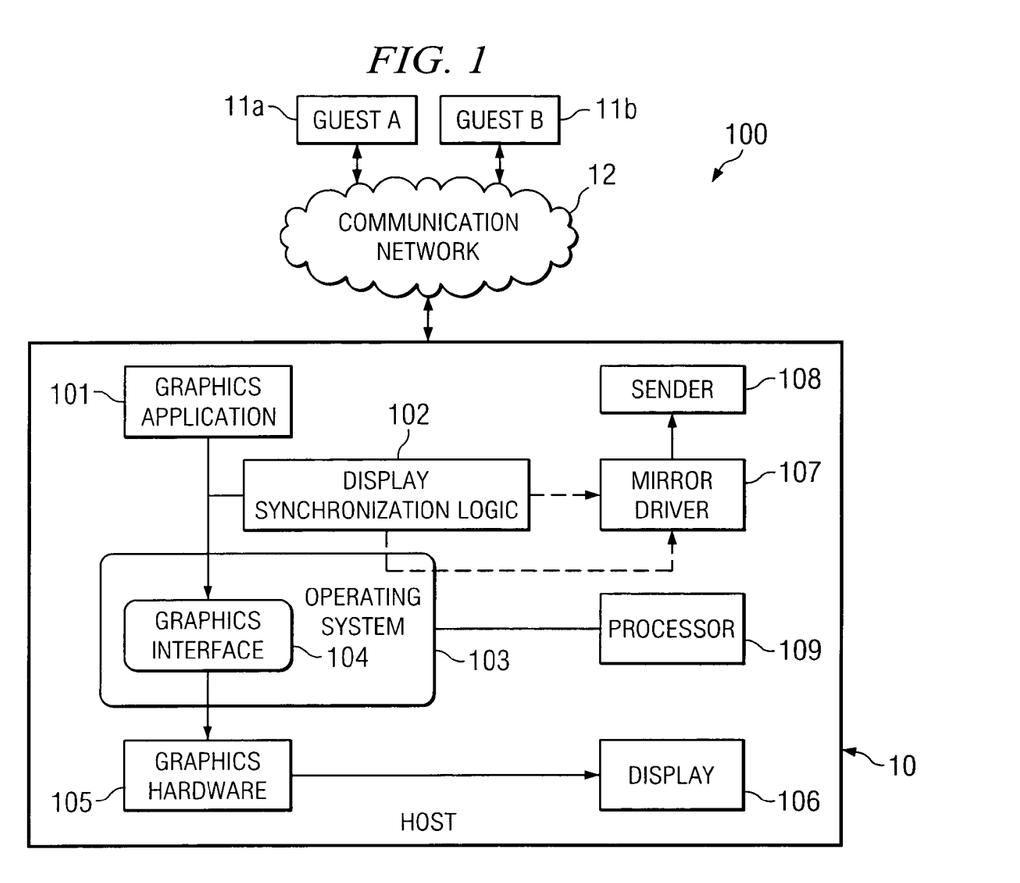
FIG. 1 shows an exemplary system according to an embodiment of the present invention.

Turning to FIG. 1, an exemplary system 100 according to an embodiment of the present invention is shown. System 100 includes a host computer 10 (or "host"), and guest computers 11a and 11b (or "guests") that are communicatively coupled to the host computer 10 via a communication network 12. Each of the host computer 10 and guest computers 11a and 11b may be any processor-based device, including without limitation a personal computer (PC), laptop, server, workstation, or personal data assistant (PDA). Further, the host computer 10 and guest computers 11a and 11b need not be the same type of processor-based device. For instance, host computer 10 may be a server or PC, while guest computers 11a and 11b may be workstations or laptops, as examples. As described further herein, in certain embodiments guest computers 11a and 11b are lower-ended computers that need not locally have the application being executed for generating the displayed data, the processing-power of the host computer 10, and/or the graphics capabilities of the host computer 10. While two guests are shown in this example as communicatively coupled to host 10 for display sharing, this is merely illustrative as any number of guests may be so coupled. Communication network 12 may be any suitable communication network, such as a local area network (LAN), the Internet or other Wide Area Network (WAN), an intranet, a wireless network, telephony network, any combination of the aforementioned networks, and/or any other communication network now known or later developed within the networking arts which enables two or more computers to communicate with each other.

In this exemplary system 100, guests 11a and 11b "share" the display of host 10. In this manner, an application 101 may be executing on host 10 to generate output to the host's display 106, and guests 11a and 11b share such display such that their respective displays are synchronized with the display 106 of host 10. In some instances, host 10 may be referred to as a "sender" and guests 11a and 11b may be referred to as "receivers". However, because in certain embodiments host 10 is capable of not only sending display data to guests 11a and 11b, but is also capable of receiving input from such guests 11a and 11b, it is referred to broadly herein as a "host" because it hosts (executes) the graphics application 101 that generates the display data being shared. Similarly, because in certain embodiments guests 11a and 11b are capable of not only receiving display data from host 10, but are also capable of sending data to be input to host 10, they are referred to broadly herein as "guests." In some instances, a computer may be a "host" at one time and a "guest" at other times. In other instances, a computer may not comprise a graphics application and/or sufficient graphics processing capability to act as a host, but may nevertheless be a guest.

Host 10 includes one or more processors 109. Host 10 further comprises a graphics application 101 stored to a data storage device, such as random access memory (RAM), hard disk, floppy disk, optical disc, etc., that is executable by processor 109. Host computer 10 also comprises operating system 103, which may be any operating system (OS) now known or later developed, such as WINDOWS, UNIX, LINUX, HP-UX, and MacOS. Host computer 10 also comprises graphics hardware 105 which is operable to process graphics operations to generate display data for displaying on display 106. Graphics hardware 105 may include such hardware as one or more of the following: NVidia 980XGL, NVidia FX2000, a peripheral component interconnect (PCI), accelerated graphics port (AGP) or PCI-Express graphics adapter, as examples.

OS 103 comprises a graphics interface 104 (e.g., an Application Program Interface (API), such as OpenGL). Graphics interface 104 is operable to receive graphics calls (e.g., from graphics application 101) for graphics hardware 105 as is well-known. Host computer 10 further comprises mirror driver 107, sender 108, and display synchronization logic 102.

In operation, graphics application 101 is executable by host 10 to generate graphics operations, which are directed to graphics interface 104 of OS 103. In this system, graphics interface 104 does not natively support display sharing. That is, graphics interface 104 does not trigger synchronization of the displays of guests 11a and 11b responsive to a graphics operation being performed via such graphics interface on the host computer 10. As discussed further below, in certain embodiments the graphics interface 104 is a 3D graphics interface. However, in certain embodiments the graphics operations may be any type of graphics operations (2D or 3D), and graphics interface 104 does not support display sharing for such graphics operations. For instance, OpenGL is a graphics interface that may, in some instances, be used for performing 3D graphics operations, and such graphics interface does not support display sharing, as discussed further herein.

In this exemplary embodiment, display synchronization logic 102 monitors the graphics operations directed from graphics application 101 to graphics interface 104, and based upon such monitoring detects when updated display data should be sent to the guests 11a and 11b to reflect the graphics operations. For instance, display synchronization logic 102 may copy the detected graphics operations to a mirror driver 107, and the mirror driver 107 uses the information from these operations to construct a list of regions that have changed on the host's display 107. Sender 108 uses this information compiled by the mirror driver 107 to synchronize the displays of guests 11a and 11b. That is, sender 108 sends the appropriate display data to guests 11a and 11b to synchronize their displays with display 106 of host 10 in accordance with the information compiled by mirror driver 107. Mirror driver 107 and sender 108 are known for use in existing systems for 2D display sharing. In general, the sender 108 queries the mirror driver 107 for region changes (i.e., changes in regions of a display/window), which ensures that the display sharing system does not get backed up with changes when no guest has handled pending changes. That is, the sender 108 recognizes the regions that have changed on the host's display 106 and attends to sending display data to guests 11a and 11b for updating the corresponding regions on their respective displays.

Display synchronization logic 102 directly interacts with mirror driver 107 in certain embodiments, while in other embodiments display synchronization logic 102 indirectly triggers synchronization by mirror driver 107 (e.g., via a graphics interface of the OS that supports display sharing). For instance, as described further below, in certain embodiments OS 103 comprises not only the graphics interface 104 that does not support display sharing, but it further comprises a graphics interface (e.g., FIG. 3) that does support display sharing. For instance, graphics interface 104 may be OpenGL, and OS 103 may further include Windows GDI, which as mentioned above supports display sharing. Further, in certain embodiments, display synchronization logic 102 utilizes the graphics interface of the OS that supports display sharing for triggering an update of display data to be sent to guests 11a and 11b in order to reflect graphics operations performed on host 10 via graphics interface 104 (as indicated by the dashed-line arrow from display synchronization logic 102 through OS 103 to mirror driver 107 in FIG. 1). Thus, display synchronization logic 102 provides support for display sharing for graphics operations that are performed on host 10 via graphics interface 104 which does not support display sharing.

Figure 2:
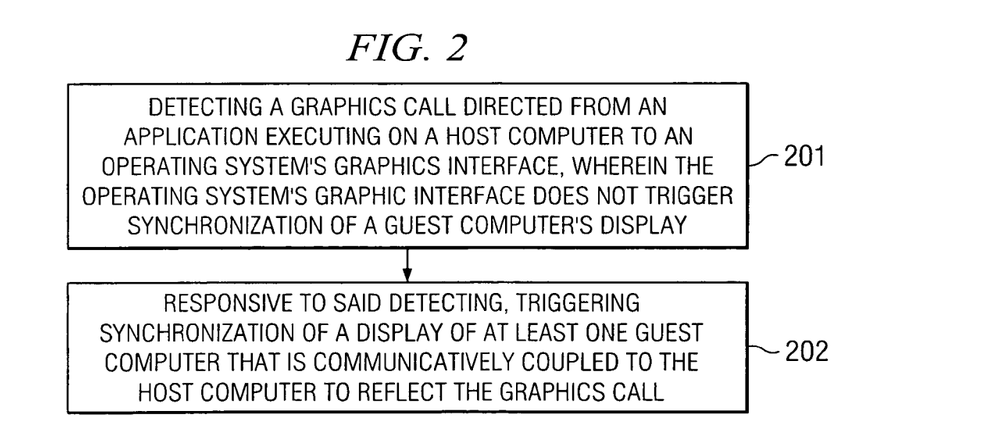
FIG. 2 shows an exemplary operational flow diagram of an embodiment of the present invention.

Turning to FIG. 2, an exemplary operational flow diagram of an embodiment of the present invention is shown. In operational block 201, display synchronization logic 102 detects a graphics call directed from an application 101 executing on host computer 10 to an OS's graphics interface 104, wherein such graphics interface 104 does not trigger synchronization of a guest computer's display. In operational block 202, responsive to the display synchronization logic 102 detecting a graphics call to graphics interface 104, display synchronization logic 102 triggers synchronization of a display of at least one guest computer 11a, 11b that is communicatively coupled to host computer 10 in order to reflect the effect of the graphics call on their respective displays. Display synchronization logic 102 may trigger such synchronization by directing a graphics call (e.g., transparent fill) to a graphics interface of the OS that does support display sharing. Exemplary techniques for triggering such synchronization are described further herein.

Figure 3:
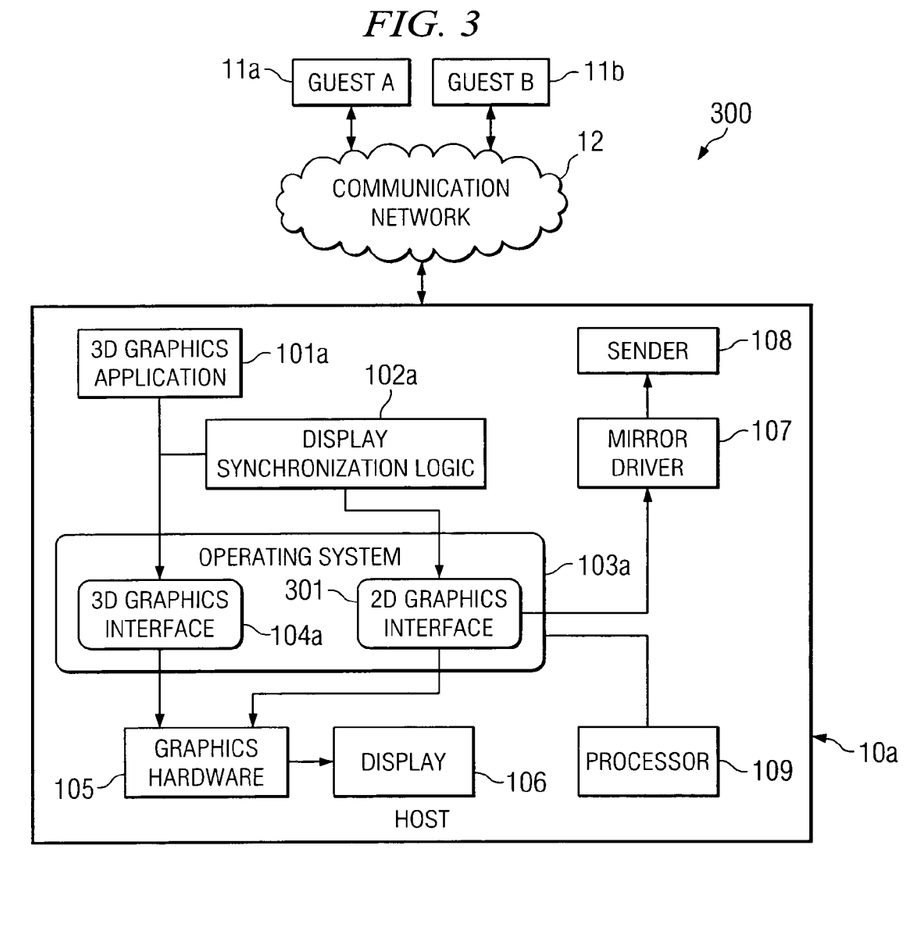
FIG. 3 shows another exemplary system according to an embodiment of the present invention.

Turning to FIG. 3, an exemplary system 300 according to one embodiment of the present invention is shown. System 300 comprises a host computer 10a (or "host"), and guest computers 11a and 11b (or "guests") that are communicatively coupled to the host computer 10a via communication network 12. Host computer 10a is one exemplary embodiment of host computer 10 described above with FIG. 1.

In this exemplary system 200, a 3D graphics application 101a is executing on host 10a to generate output to the host's display 106, and guests 11a and 11b share such display such that their respective displays (not specifically shown) are synchronized with the display 106 of host 10a. It should be recognized that in certain implementations a display 106 may not be connected to host 10a or the display 106 may, in some way, be disabled. In such instances, the display data (performed by the graphics hardware 105, such as a graphics card) is still generated for host 10a even though it may not be actually presented on a display screen at host 10a. Those of ordinary skill in the art will recognize that embodiments of the present invention are applicable for display sharing, even though the display data generated at host 10a need not be output to an actual display screen. Thus, when referring herein to synchronizing the host's display with guest displays herein, such host and/or guests need not have a physical display for outputting the display data, but rather such synchronizing encompasses synchronizing the display data generated by graphics hardware 105 of host 10A with the guests even though such display data may not be actually output on a physical screen at one or more of the host and guests.

3D graphics application 101a is stored to a data storage device, such as random access memory (RAM), hard disk, floppy disk, optical disk, etc., that is executable by processor 109. Examples of such 3D graphics application 101a include OpenGL and Direct3D. Host computer 11a also includes operating system 103a, which may be any operating system (OS) now known or later developed, such as WINDOWS, UNIX, LINUX, HP-UX, and MacOS. OS 103a is one example of OS 103 of FIG. 1. In this example, OS 103a includes a 3D graphics interface 104a (e.g., API, such as OpenGL), and a 2D graphics interface 301 (e.g., an API, such as WINDOWS GDI). 3D graphics interface 104a is one example of graphics interface 104 of FIG. 1. Such 3D graphics interface 104a is operable to receive 3D graphics calls (e.g., from 3D graphics application 101$_A$) for graphics hardware 105 as is well-known, and 2D graphics interface 301 is operable to receive 2D graphics calls (e.g., from a 2D graphics application) for graphics hardware 105 as is well-known. Host computer 10a further comprises mirror driver 107, sender 108, and display synchronization logic 102a.

OpenGL (Open Graphics Library) is the computer industry's standard API for defining 3D graphic images. Prior to OpenGL, any company developing a graphical application typically had to rewrite the graphics part of it for each OS platform and had to be cognizant of the graphics hardware as well. With the standardization of OpenGL, portability has been improved as an application can create the same effects in any OS using any OpenGL-adhering graphics adapter.

As those of ordinary skill in the art will appreciate, OpenGL specifies a set of "commands" or immediately executed functions. Each command directs a drawing action or causes special effects. A list of these commands can be created for repetitive effects. OpenGL is independent of the windowing characteristics of each OS, but provides special "glue" routines for each OS that enable OpenGL to work in that system's windowing environment. OpenGL comes with a large number of built-in capabilities that can be requested through the API, including as examples hidden surface removal, alpha blending (transparency), antialiasing, texture mapping, pixel operations, viewing and modeling transformations, and atmospheric effects (fog, smoke, and haze). While OpenGL is provided as a specific exemplary 3D graphics interface that may be used in a system in which an embodiment of the present invention is employed, embodiments of the present invention may likewise be employed with any other 3D graphics interface now known or later developed and thus is not limited in application to OpenGL.

3D graphics application 101a is executable by host 10a to generate 3D graphics operations. As is well known, 3D graphics operations differ from 2D graphics operations. In general, 3D computer graphics model a 3D object and then generate display data for a view of the modeled 3D object. Thus, 3D graphics operations generated by 3D graphics application 101a include operations for generating display data for a view of a modeled 3D object. For example, an automobile may be modeled as a 3D object and, depending on the view of the automobile, different display data may be generated. For instance, a view of the front of the automobile may be displayed, such that the headlights and other features on the front of the automobile are displayed. As a further example, a user may interact with 3D graphics application 101a to rotate the automobile to view it from the rear such that the taillights and other features of the rear of the automobile are displayed. It becomes desirable to synchronize the displays of host 10a and guests 11a and 11b such that if a user rotates the automobile in this manner, all of their respective displays update to reflect the new display data. As described further herein, while display sharing systems exist for some 2D graphics, embodiments are provided for display sharing systems for sharing 3D graphics, especially a portable display sharing system that is capable of sharing 3D graphics without requiring modifications to the host's architecture (e.g., OS, graphics hardware, etc.).

Display synchronization logic 102a monitors 3D graphics operations directed from 3D graphics application 101a to 3D graphics interface 104a, and based upon such monitoring, detects when updated display data should be sent to the guests 11a and 11b to reflect 3D graphics operations. In one embodiment, the 2D communication path (e.g., the 2D graphics interface 301) is used by display synchronization logic 102a for triggering an update of display data to be sent to guests 11a and 11b in order to reflect the effects of 3D graphics operations performed on host 10a. For instance, upon display synchronization logic 102a detecting a 3D graphics operation directed from 3D graphics application 101a to 3D graphics interface 104a, display synchronization logic 102a may generate a 2D drawing command, such as a transparent fill, that it directs to 2D graphics interface 301. 2D graphics interface 301 copies the 2D drawing command to mirror driver 107, in its traditional manner. Thus, the mirror driver 107 is informed of an update in the display data, and accordingly the sender 108 uses this information compiled by the mirror driver 107 to synchronize the displays of guests 11a, 11b.

The 3D graphics interface 104a processes the 3D graphics call and generates an updated display for a region of display 106. The 2D drawing command generated by display synchronization logic 102a may be a transparent fill to the corresponding region of display 106 that was affected by the 3D drawing operation. Mirror driver 107 then causes sender 108 to send to the guests 11a and 11b data reflecting the changed region of display 106. For instance, 2D data representing the modified region of display 106 may be sent to guests 11a and 11b. Such 2D data may, for instance, be a "snapshot" of the modified region of display 106. Thus, even though 3D graphics processing generated the resulting 2D display data for the host display 106, in certain embodiments the resulting 2D display data may be sent to guests 11a and 11b.

Thus, this exemplary embodiment uses the 2D graphics interface 301 for notifying the mirror driver 107 when a 3D graphics operation has been performed on host 10a such that the updated display data resulting from the 3D graphics operation is sent to guests 11a, 11b. As described further herein, this exemplary embodiment may be implemented without requiring modification to the 3D graphics application 101a, the existing OS graphics interfaces 104a and 301, the graphics hardware 105, the mirror driver 107, or sender 108. Thus, display synchronization logic 102a can be implemented (e.g., as software) and used for enabling display synchronization for 3D graphics operations without requiring modifications to the architecture of host 10a (or to guests 11a, 11b).

Further, in certain embodiments, the guests 11a and 11b need not have 3D processing capability. Instead, the 2D data for a region of the host's display 106 that is presented as a result of the 3D processing by the host is sent to the guests. For example, when a 3D "car" object is rotated by application 11a to generate a display of the car's rear instead of its front, the host 10a performs this 3D processing to generate a resulting 2D display, which is presented on the host's display 106. The resulting 2D display data for presenting the car's rear may be sent to the guests 11a and 11b. In this sense, the 3D data need not be sent to the guests 11a and 11b, but instead the resulting 2D display data for all or a portion of the host's display 106 that has changed as a result of the 3D processing may be sent to the guests 11a and 11b. The guests need not even be aware that the display data was generated via 3D image processing by host 10a in certain embodiments. That is, the guests 11a and 11b need not be aware of how the image was rendered on the host 10a (e.g., via 3D processing).

Figure 4:
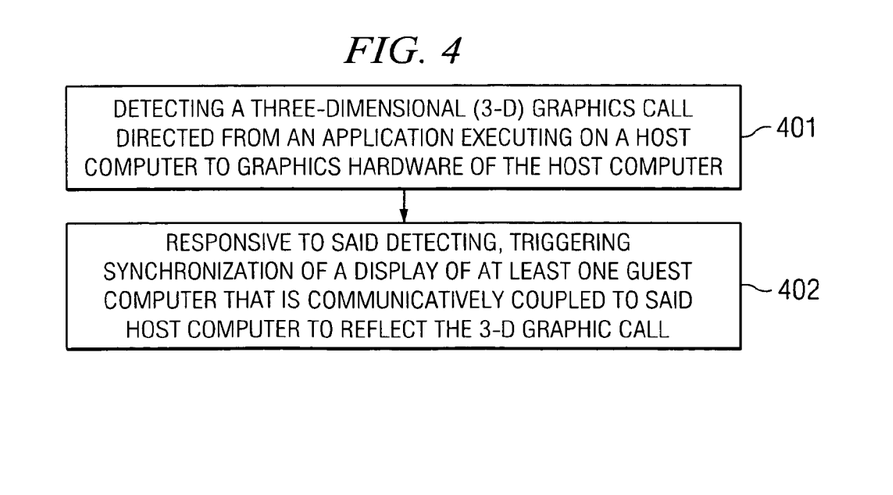
FIG. 4 shows an exemplary operational flow diagram of the embodiment of FIG. 3.

Turning to FIG. 4, an exemplary operational flow diagram of the embodiment of FIG. 3 is shown. In operational block 401, display synchronization logic 102a detects a 3D graphics call directed from an application 101a executing on host computer 11a to the host computer's graphics hardware 105 (via the OS's graphics interface 104a). In operational block 402, responsive to the display synchronization logic 102a detecting a 3D graphics call, display synchronization logic 102a triggers synchronization of a display of at least one guest computer 11a, 11b that is communicatively coupled to host computer 10a in order to reflect the 3D graphics call on their respective displays. Exemplary techniques for triggering such synchronization are described further herein.

Figure 5:
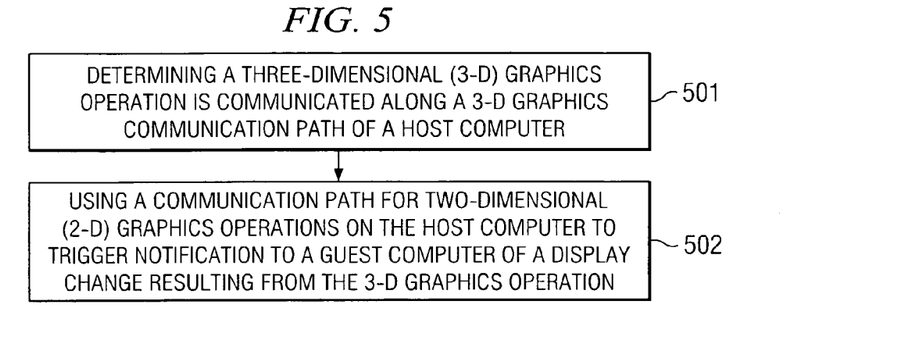
FIG. 5 shows another exemplary operational flow of an embodiment, such as that of FIG. 3.

FIG. 5 shows another exemplary operational flow of an embodiment, such as that of FIG. 3. In operational block 501, display synchronization logic 102a determines that a 3D graphics operation is communicated along a 3D graphics communication path of host computer 10a. For instance, in the example of FIG. 3, such 3D graphics communication path is from 3D graphics application 11a through 3D graphics interface 104a to graphics hardware 105. In operational block 502, display synchronization logic 102a uses a communication path for 2D graphics operations on the host computer $10_A$ to trigger notification to a guest computer 11a, 11b of a display change resulting from the 3D graphics operation. For instance, in the example of FIG. 3, such 2D graphics communication path includes 2D graphics interface 301, which copies a 2D graphics operation for a region of the display affected by the 3D graphics operation to mirror driver 107, where mirror driver 107 causes sender 108 to send the modified region to the guests 11a and 11b.

Figure 6:
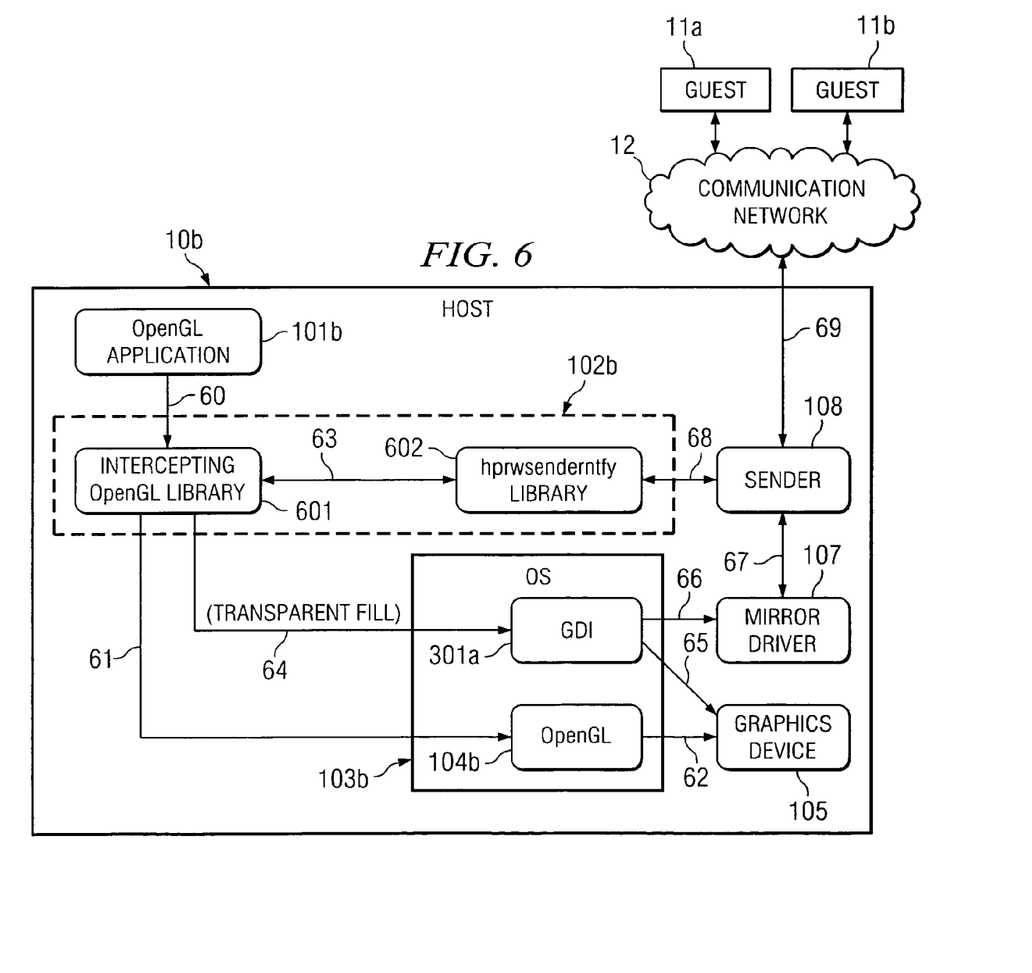
FIG. 6 shows an exemplary implementation of a system according to the embodiment of FIG. 3.

FIG. 6 shows an exemplary implementation of a system according to the embodiment of FIG. 3. The system of FIG. 6 comprises a host computer 10b (or "host"), and guest computers 11a and 11b (or "guests") that are communicatively coupled to the host computer 10b via communication network 12. Host computer 10b is one exemplary embodiment of host computer 10a described above with FIG. 3.

In this exemplary system of FIG. 6, an OpenGL application 101b is executing on host 11b to generate output to the host's display, and guests 11a and 11b share such display such that their respective displays are synchronized with the display of host 10b. Host computer 10b also comprises operating system 103b, which is one example of OS 103a of FIG. 3. In this example, OS 103b comprises GDI graphics interface $301_a$, which is one example of 2D graphics interface 301 of FIG. 3. OS 103b further comprises OpenGL graphics interface 104b, which is one example of 3D graphics interface 104a of FIG. 3. Such Windows OS 103b and the GDI and OpenGL graphics interfaces 301a and 104b are well known in the art. As mentioned above, OpenGL (Open Graphics Library) is the computer industry's standard API for defining 3D graphic images.

Host computer 10a further comprises mirror driver 107, sender 108, and display synchronization logic 102b. In this example, display synchronization logic 102b, which is one exemplary implementation of display synchronization logic 102a of FIG. 3, comprises an intercepting OpenGL library 601 and a sender notification library 602. In this exemplary implementation, sender 108 communicates with mirror driver 107 via shared memory and a messaging mechanism provided by the Windows OS 103b. Sender 108 communicates with the sender notification library (shown as "hprwsenderntfy.dll") 602 via a Windows messaging mechanism and a shared data segment in the library. This shared data segment is also used as a means of communication between the sender 108 and the intercepting library 601 (which may be referred to as the "OpenGL32.dll" library, as discussed further herein). The intercepting library 601 is used for communication between the OpenGL application 101b and the mirror driver 107, via a graphics operation described further below.

Intercepting library 601 may be placed in the same directory as the OpenGL application 101b. The application 101b loads this intercepting library 601 upon startup, which in turn loads the Windows OpenGL32.dll library, shown as OpenGL graphics interface 104b. The intercepting library 601 then intercepts calls 60 that application 101b makes to OpenGL graphics interface 104b. Whenever the sender 108 is connected to a receiver (of one or more guests), the sender 108 sets a state variable in the shared data segment of the sender notification library 602 ("hprwsenderntfy.dll") that the intercepting library 601 can check to determine whether a guest 11a, 11b is connected to the host $10_B$. When a graphics call is made into the OpenGL graphics interface 104b that changes the display and a guest is connected to the host 10b, the intercepting library 601 performs a 2D graphics operation (operation 6) to the window the 3D command was sent to. Preferably, the 2D graphics operation is transparent, such as a transparent fill operation. The mirror driver 107 then sees that the display changed via the 2D graphics operation (because the GDI graphics interface 301A copies the 2D operation to the mirror driver 107), and can in turn update its changed region list. Accordingly, sender 108 then sends the updated region (e.g., having the modified 2D display resulting from the 3D graphics operation) to guests 11*a* and 11*b*. Operation of the exemplary implementation of FIG. 6 is described further below with FIG. 7.

Figure 7:
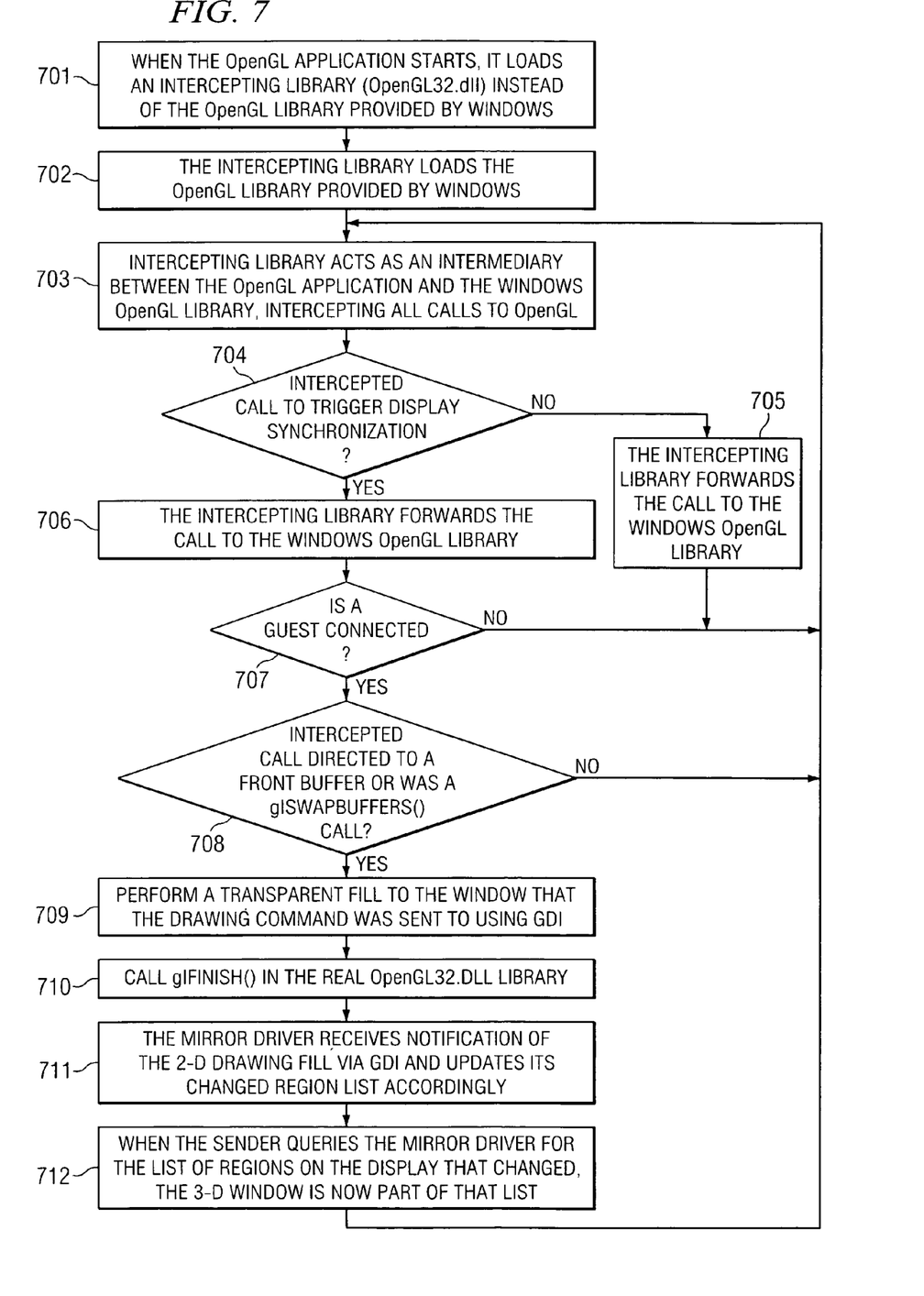
FIG. 7 shows an exemplary operational flow diagram of the embodiment of FIG. 6.

FIG. 7 shows an exemplary operational flow diagram of the system of FIG. 6. As mentioned above, an intercepting library ("OpenGL32.dll library") 601 may be placed into the directory where the OpenGL application 101*b* resides. As shown in block 701 of FIG. 7, when the OpenGL application 101*b* starts, it loads this intercepting library 601 instead of the library provided by Windows. This intercepting library 601 then loads the OpenGL library (or "graphics interface") 104*b* provided by Windows 103*b*, in block 702. Intercepting library 601 acts as an intermediary between the OpenGL application 101*b* and the Windows OpenGL library 104*b*, intercepting all calls into OpenGL graphics interface 104*b*, in block 703. Thus, as OpenGL application 101*b* makes calls 60 (FIG. 6) directed to OpenGL graphics interface 104*b*, intercepting library 601 intercepts those calls.

In operational block 704, the intercepting library 601 determines whether an intercepted call is to trigger display synchronization. That is, the intercepting library 601 determines whether an intercepted call is a call that generates a display change such that updated display data should be sent to guests 11*a*, 11*b* to maintain their displays synchronized with that of host 10*b*. If the call is not one that triggers display synchronization (i.e., does not result in a change in the display), operation advances to block 705 whereat the intercepting library 601 forwards the call to the Windows OpenGL graphics interface 104*b*, and then operation returns to block 703 to continue intercepting OpenGL calls. That is, in block 705 the intercepting library forwards 61 (FIG. 6) the intercepted call to the Windows OpenGL graphics interface 104*b*, which in turn sends 62 (FIG. 6) the proper command(s) to graphics device 105.

When determined in block 704 that the intercepted OpenGL call is one that triggers display synchronization, such as glSwapBuffers( ), glFlush( ), or glFinish( ) as examples, the intercepting library 601 forwards 61 (FIG. 6) the intercepted call to the Windows OpenGL graphics interface 104*b* as usual in block 706, and then proceeds to operational block 707. In block 707, the intercepting library 601 checks 63 (FIG. 6) with the sender notification library 602 (hprwsenderntfy.dll) to determine whether a guest is communicatively coupled to host 10*b*. If no guest is coupled to host 10*b* (i.e., display sharing is not being performed), operation returns to block 703 to continue intercepting OpenGL calls. If determined in block 707 that a guest is coupled to host 10*b* operation advances to block 708.

In block 708 the intercepting library 601 determines whether the intercepted call was a glFlush( ) or glFinish( ) call directed to a front buffer or was a glSwapBuffers( ) call. OpenGL distinguishes off-screen and on-screen drawing with the use of front and back buffer terminology. Hence, this exemplary embodiment checks if a glFlush( ) or glFinish( ) was done on the front or back buffer. If such a command is requested for the front buffer, then a change is made on the display (and operation advances to block 709), otherwise (if on the back buffer) the call is ignored as it did not change anything on the display. glSwapBuffers( ) indicates that off-screen graphics are being transferred on screen, which results in a change in the display and so operation advances to block 709. If determined in block 708 that the intercepted call is neither a glFlush( ) or glFinish( ) call directed to a front buffer nor a glSwapBuffers( ) call, operation returns to block 703 to continue intercepting OpenGL calls. If determined in block 708 that the intercepted call was a glFlush( ) or glFinish( ) call directed to a front buffer or was a glSwapBuffers( ) call, operation advances to block 709.

In block 709, the intercepting library 601 performs 64 (FIG. 6) a transparent fill to the window that the intercepted 3D graphics command was sent to using GDI 301*a*. Accordingly, GDI 301*a* communicates 65 (FIG. 6) instructions to the graphics hardware 105 for the transparent fill. In block 710, the intercepting library 601 calls glFinish( ) in the OpenGL graphics interface 104*b*. This helps reduce tearing that sometimes occurs when grabbing the frame buffer during a glSwapBuffers( ) call.

In block 711, mirror driver 107 receives 66 (FIG. 6) notification of the 2D drawing fill via GDI 301*a* and updates its changed region list accordingly. In block 712, when the sender 108 queries 67 (FIG. 6) the mirror driver 107 for the list of regions on the display that changed, the 3D window (the region of the display that was changed as a result of the 3D operation) is now part of that list. Operation returns to block 703 whereat the intercepting library continues intercepting OpenGL calls.

An exemplary process of a guest computer 11*a*, 11*b* connecting and the sender 108 setting the state in the sender notification library 602 is as follows. A guest 11*a*, 11*b* establishes a connection with the sender 108 (as indicated by line 69 of FIG. 6). The sender 108 then sets 68 (FIG. 6) a state variable in the shared data segment of the sender notification library 602 that indicates a guest is connected to host 10*b* for display sharing.

Figure 8:
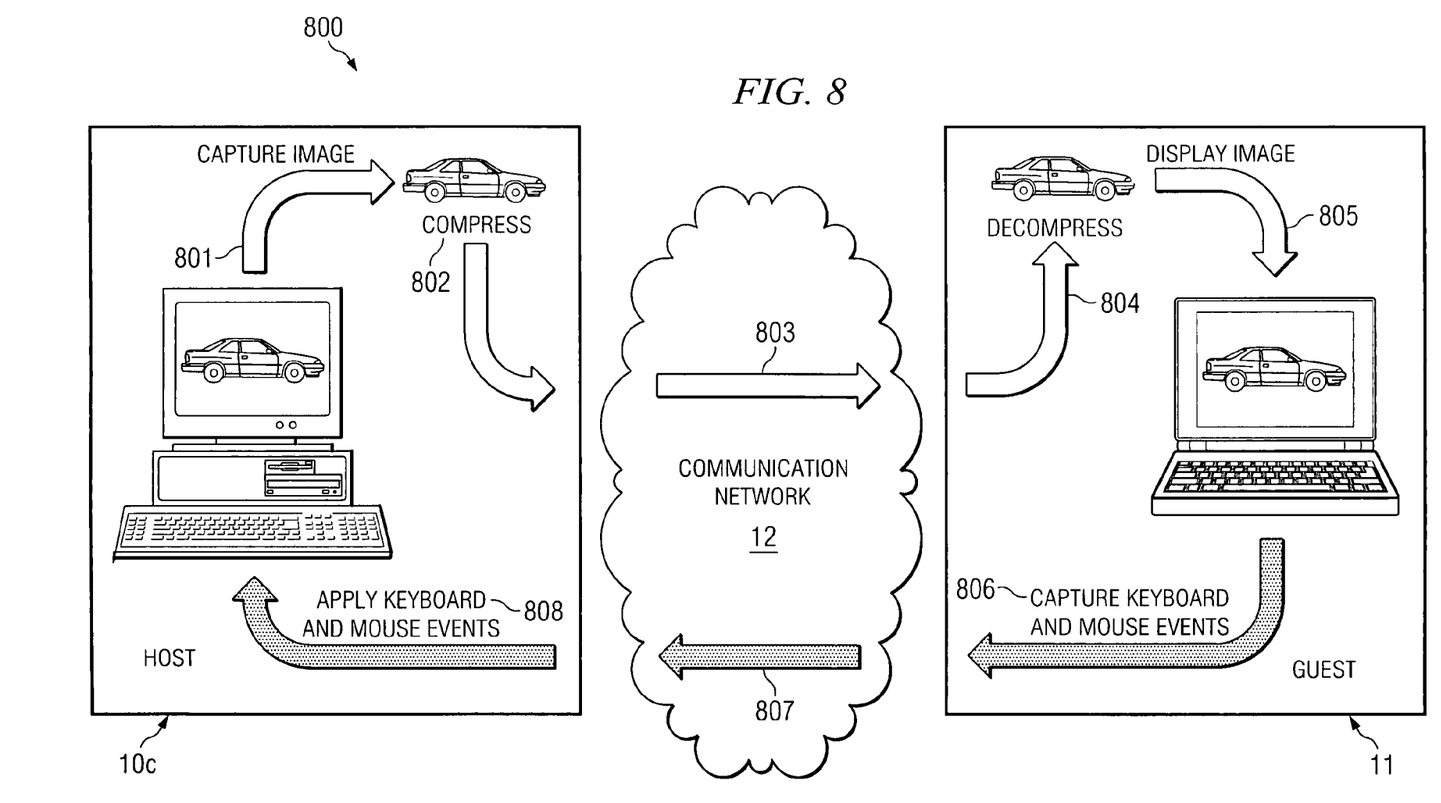
FIG. 8 shows another exemplary system in which embodiments of the present invention may be employed.

FIG. 8 shows another exemplary system 800 in which embodiments of the present invention may be employed. System 800 illustrates an exemplary display sharing scenario in which a host 10*c* shares its display with a guest 11. As described above, host 10*c* includes display synchronization logic 102 that captures 801 display data for updating the display of guest 11. In certain embodiments, the captured display data may be compressed 802, then communicated 803 over communication network 12 to guest 11 where the display data is decompressed 804 and displayed 805. Further, in this exemplary embodiment, guest 11 may capture inputs, such as keyboard and mouse events 806, which are communicated 807 over communication network 12 to host 10*c* where the inputs are applied to the application 101 executing locally on host 10*c*.

The exemplary embodiments described above provide techniques for synchronizing a guest's display with a host's display when the host's OS provides a graphics interface that does not support display sharing. The exemplary techniques provided herein enable high-efficiency because they enable changes that are made to a display to be tracked as they are made, rather than polling the full screen for detecting display changes. Further, only those regions that have changed need be sent for updating a guest's display, rather than repeatedly sending the entire content of the host's display, which minimizes network traffic and CPU utilization. Additionally, the exemplary techniques described above do not require changes to the graphics hardware, but are capable of working with all graphics hardware. The exemplary techniques described above do not require architectural changes to the host or guests. Rather, the solution may be added (e.g., as software) to the host's existing architecture without requiring any changes to the applications executing on the host, the host's OS, or the host's graphics hardware.

Some exemplary embodiments provide techniques for synchronizing a guest's display with a host's display when a 3D drawing operation has resulted in a change on a display, and the host only has 2D display sharing capability.

What is claimed is:

1. A method comprising:
    detecting a graphics call directed from an application executing on a host computer to an operating system's graphics interface, wherein the operating system's graphics interface does not trigger synchronization of a guest computer's display; and
    responsive to said detecting, triggering synchronization of a display of at least one guest computer that is communicatively coupled to said host computer to reflect the graphics call;
    wherein said triggering synchronization further comprises generating a two-dimensional (2D) graphics call directed to a 2D graphics interface of said operating system;
    wherein said 2D graphics call comprises a call for a transparent graphics operation directed to a region of a display of the host computer that corresponds to another region changeable by a 3D graphics call.

2. The method of claim 1 wherein said triggering synchronization comprises:
    generating a graphics call directed to another graphics interface of said operating system, wherein said another graphics interface triggers synchronization of said guest computer's display.

3. The method of claim 2 wherein the operating system's graphics interface is OpenGL and wherein the another graphics interface of said operating system is Graphics Device Interface (GDI).

4. The method of claim 1 wherein said detecting a graphics call comprises:
    detecting a three-dimensional (3D) graphics call directed from said application to a 3D graphics interface of the operating system.

5. The method of claim 1 wherein said 2D graphics interface copies the 2D graphics call to a mirror driver.

6. The method of claim 1 further comprising:
    determining if at least one guest computer is communicatively coupled to said host computer for display sharing.

7. The method of claim 6 further comprising:
    performing said triggering synchronization responsive to said detecting when determined that at least one guest computer is communicatively coupled to said host computer for display sharing.

8. The method of claim 1 further comprising:
    determining if said detected graphics call changes the display of said host computer; and
    performing said triggering synchronization responsive to said detecting when determined that said detected graphics call changes the display of said host computer.

9. A system comprising:
    an application executable to generate graphics operations;
    graphics hardware for processing said graphics operations to generate display data;
    an operating system comprising a graphics interface for said graphics hardware, wherein said graphics interface does not trigger synchronization of a guest computer's display; and
    display synchronization logic operable to monitor said graphics operations directed from said application to said graphics interface and trigger synchronization of a guest computer's display to reflect said graphics operations;
    wherein said graphics interlace comprises an interlace for three dimensional (3D) graphics operations;
    wherein said operational system further comprises an interface for two dimensional (2D) graphics operations;
    wherein the system further comprises a mirror driver, said interface for 2D graphics operations is operable to notify said mirror driver of said 2D graphics operations.

10. The system of claim 9 wherein said operating system further comprises an interface for two-dimensional (2D) graphics operations.

11. The system of claim 10 wherein said interface for 3D graphics operations is OpenGL and said interface for 2D graphics operations is Graphics Device Interface (GDI).

12. The system of claim 9 wherein said operating system further comprises an interface for two-dimensional (2D) graphics operations; and wherein said display synchronization logic is operable to intercept 3D graphics calls directed from said application to said interface for 3D graphics operations and generate a 2D graphics call to said interface for 2D graphics operations.

13. The system of claim 9 wherein said operating system further comprises an interface for two-dimensional (2D) graphics operations, and wherein said interface for 2D graphics operations is operable to trigger synchronization of a guest computer's display.

14. A method comprising:
    determining a three-dimensional (3D) graphics operation is communicated along a 3D graphics communication path of a host computer; and
    using a communication path for two-dimensional (2D) graphics operations on the host computer to trigger notification to a guest computer of a display change resulting from the 3D graphics operation.

15. The method of claim 14 wherein said determining comprises:
    determining said 3D graphics communication path as comprising communication from an application to a 3D graphics interface of an operating system of the host computer.

16. The method of claim 14 wherein said determining comprises determining said 3D graphics communication path as comprising communication from an application to an OpenGL 3D graphics interface of an operating system of the host computer.

17. The method of claim 14 wherein said using said communication path for 2D graphics operations comprises using a 2D graphics interface of an operating system of the host computer.

18. The method of claim 14 wherein said using said communication path for 2D graphics operations comprises using a Graphics Device Interface (GDI) of an operating system of the host computer.

19. The method of claim 14 further comprising:
    responsive to detecting a 3D graphics call from an application to a 3D graphics interface of an operating system of the host computer, generating a 2D graphics call to a 2D graphics interface.

20. The method of claim 14 further comprising:
    responsive to detecting a 3D graphics call from an application to a 3D graphics interface of an operating system of the host computer, generating a 2D graphics call to a 2D graphics interface; and
    said 2D graphics interface notifying a mirror driver of said 2D graphics call.

21. The method of claim 14 further comprising:
    responsive to detecting a 3D graphics call from an application to a 3D graphics interface of an operating system of the host computer, generating a 2D graphics call to a 2D graphics interface, wherein said 2D graphics call is a call for a transparent graphics operation for a region of the host's display corresponding to a region that said 3D graphics call changes.

22. A system comprising:
an application executable to generate three-dimensional (3D) graphics operations;
graphics hardware for processing said 3D graphics operations to generate display data;
an operating system comprising a two-dimensional (2D) graphics interface for said graphics hardware and comprising a 3D graphics interface for said graphics hardware;
mirror driver operable to receive notification from said 2D graphics interface of a graphics operation; and
display synchronization logic operable to monitor said 3D graphics operations directed from said application to said 3D graphics interface and generate a 2D graphics operation directed to said 2D graphics interface.

23. The system of claim 22 wherein said 2D graphics interface is operable to notify a mirror driver of said 2D graphics operation.

24. The system of claim 22 wherein said 3D graphics interface comprises OpenGL, and wherein said 2D graphics interface comprises Graphics Device Interface (GDI).

25. Computer-executable software code stored to a computer-readable medium, the computer-executable software code comprising:
code for detecting three-dimensional (3D) graphics calls directed along a 3D graphics communication path from an application executing on a host computer to graphics hardware of the host computer; and
code for using a communication path for two-dimensional (2D) graphics operations on the host computer to trigger notification to a guest computer of a display change resulting from a detected 3D graphics operation.

26. The computer-executable software code of claim 25 wherein said 3D graphics communication path comprises communication from an application to a 3D graphics interface of an operating system of the host computer.

27. The computer-executable software code of claim 26 wherein said 3D graphics interface comprises OpenGL.

28. The computer-executable software code of claim 26 wherein said communication path for 2D graphics operations comprises a 2D graphics interface of an operating system of the host computer.

29. The computer-executable software code of claim 28 wherein said 2D graphics interface comprises Graphics Device Interface (GDI).

30. The computer-executable software code of claim 28 wherein said code for using further comprises:
code, responsive to detecting a 3D graphics call from said application to said 3D graphics interface, for generating a 2D graphics call to said 2D graphics interface.

31. The computer-executable software code of claim 30 wherein said 2D graphics call is a call for a transparent graphics operation for a region of the host's display corresponding to a region that said 3D graphics call changes.

* * * * *

UNITED STATES PATENT AND TRADEMARK OFFICE
CERTIFICATE OF CORRECTION

PATENT NO. : 7,432,934 B2  
APPLICATION NO. : 11/253978  
DATED : October 7, 2008  
INVENTOR(S) : Gabriel Salazar et al.

Page 1 of 1

It is certified that error appears in the above-identified patent and that said Letters Patent is hereby corrected as shown below:

In column 7, line 27, delete "11a" and insert -- 101a --, therefor.

In column 7, line 44, delete "11a" and insert -- 10a --, therefor.

In column 7, line 59, delete "11a" and insert -- 101a --, therefor.

In column 8, line 12, delete "11b" and insert -- 10b --, therefor.

In column 11, line 64, in Claim 9, after "graphics" delete "interlace" and insert -- interface --, therefor.

In column 11, line 64, in Claim 9, after "an" delete "interlace" and insert -- interface --, therefor.

In column 11, line 66, in Claim 9, delete "operational" and insert -- operating --, therefor.

Signed and Sealed this

Fourteenth Day of July, 2009

JOHN DOLL  
*Acting Director of the United States Patent and Trademark Office*